United States Patent

Cohrs et al.

[11] Patent Number: 5,129,698
[45] Date of Patent: Jul. 14, 1992

[54] TARP COVER SYSTEM WITH LEVER-OPERATED LOCKING AND BRAKE MEANS

[75] Inventors: Richard B. Cohrs; Richard J. Gothier, both of Indianapolis; Kerry W. Stadtfeld, Greenwood, all of Ind.

[73] Assignee: Aero Industries, Inc., Indianapolis, Ind.

[21] Appl. No.: 735,306

[22] Filed: Jul. 24, 1991

[51] Int. Cl.⁵ .............................................. B60P 7/04
[52] U.S. Cl. .................................. 296/98; 242/86.52
[58] Field of Search ................. 296/98; 242/99, 75.4, 242/86.52, 86.63, 86.64

[56] References Cited

U.S. PATENT DOCUMENTS

| | | | |
|---|---|---|---|
| 2,773,547 | 12/1956 | Voss | 296/98 X |
| 3,549,197 | 12/1970 | Sibley | |
| 3,549,198 | 12/1970 | Cappello | |
| 3,628,826 | 12/1971 | Sibley | |
| 3,977,719 | 8/1976 | Thurston | 296/98 |
| 4,082,347 | 4/1978 | Petretti | 296/98 |
| 4,252,362 | 2/1981 | Campbell | 296/98 |
| 4,893,864 | 1/1990 | Bailey | 296/98 |
| 5,054,840 | 10/1991 | Wilhite | 296/98 |

FOREIGN PATENT DOCUMENTS 2523527 9/1983 France.

*Primary Examiner*—Russell D. Stormer
*Assistant Examiner*—Joseph D. Pape
*Attorney, Agent, or Firm*—Laubscher, Presta & Laubscher

[57] ABSTRACT

A tarp cover system includes a pawl (44) and ratchet (26) mechanism for locking a tarp cover (6) in a rolled-up truck-body-uncovered condition, and a lever arrangement (32,38) that is initially squeezed with one hand by the operator to release the pawl from the ratchet to unlock the rolled up cover, and is subsequently pivoted by the same hand to brake (28,34) the unwinding of the cover as it is spring-biased toward the truck-body-covered condition. To re-cover the truck body, a crank shaft (24) is rotated to rotate the roll in the cover-winding direction against the biasing force of the spring, the ratchet mechanism preventing uncontrolled unwinding of the cover.

17 Claims, 4 Drawing Sheets

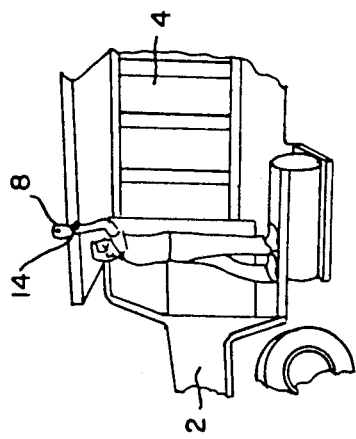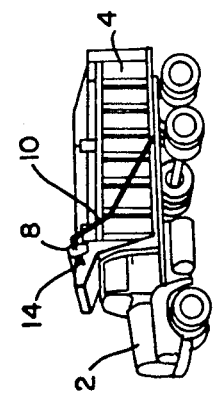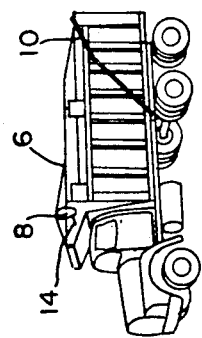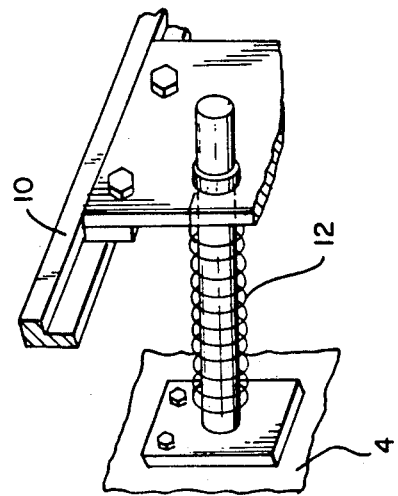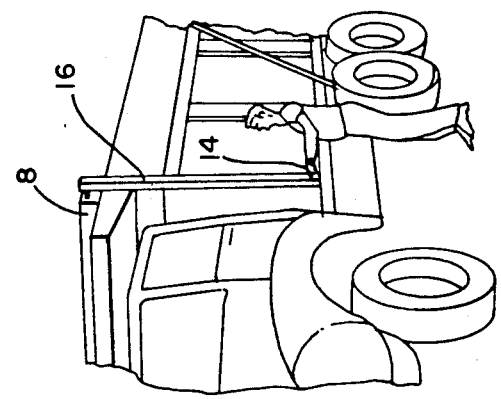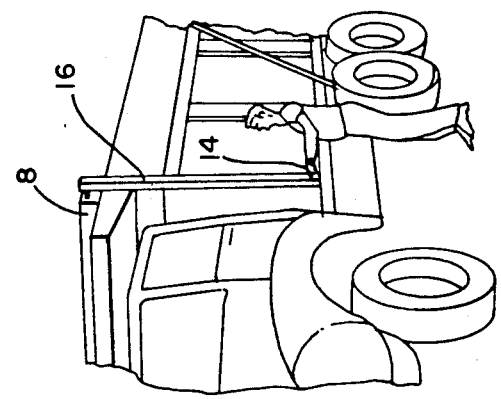
FIG. 1
FIG. 2
FIG. 3
FIG. 4
FIG. 5
FIG. 6
FIG. 7

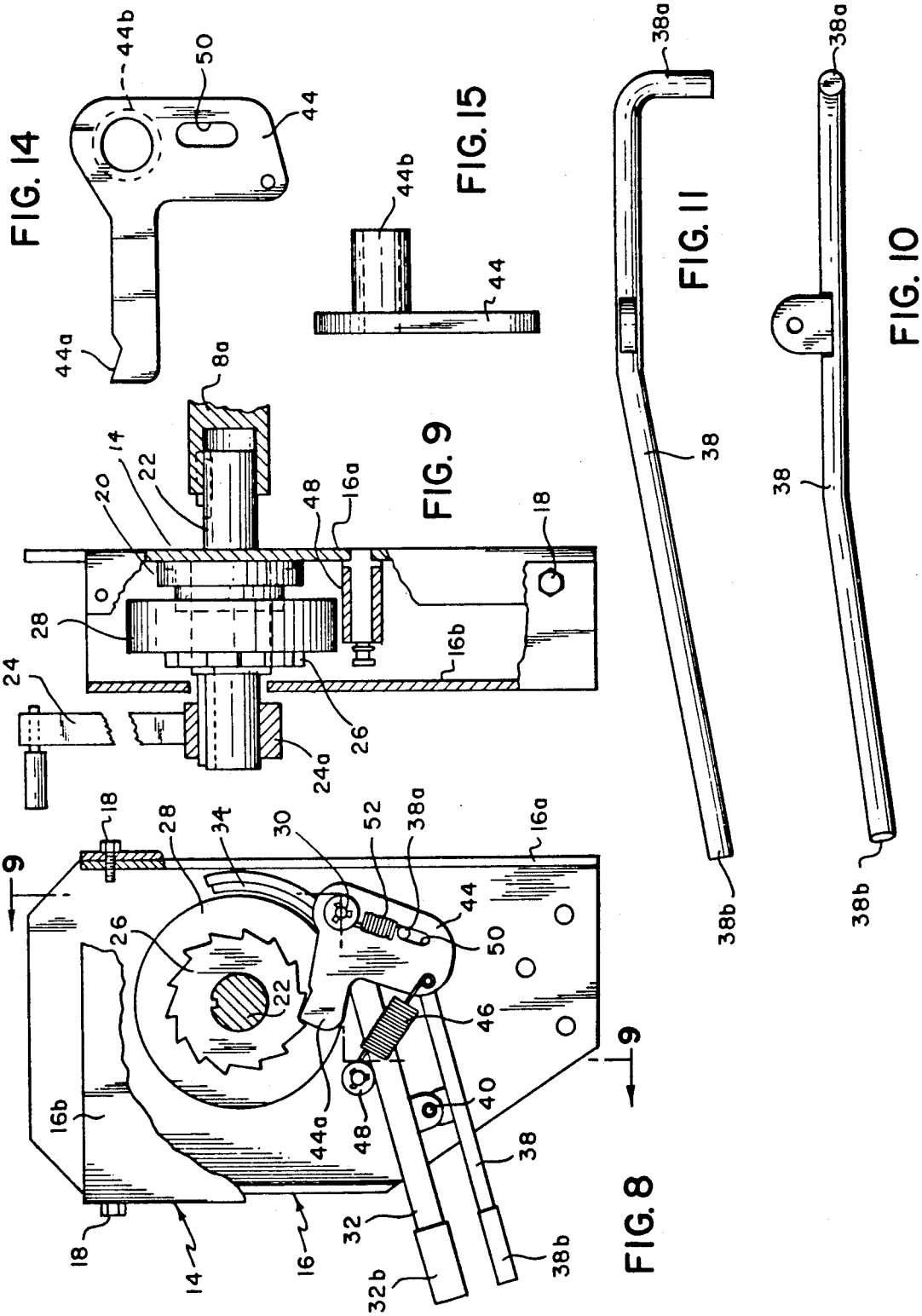

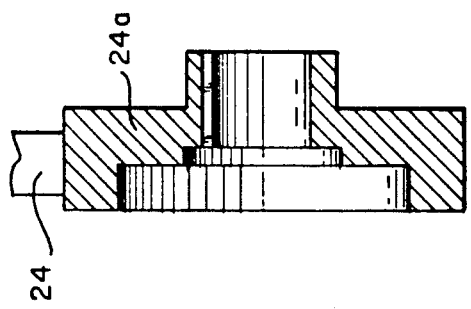
FIG. 18
FIG. 19
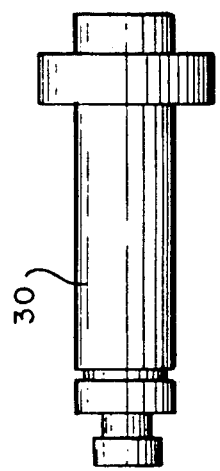
FIG. 17
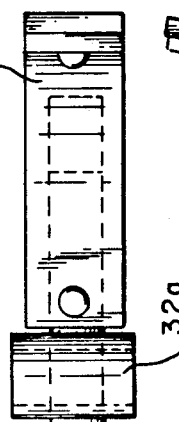
FIG. 13
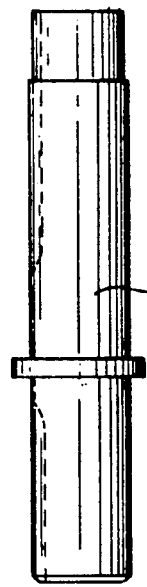
FIG. 16
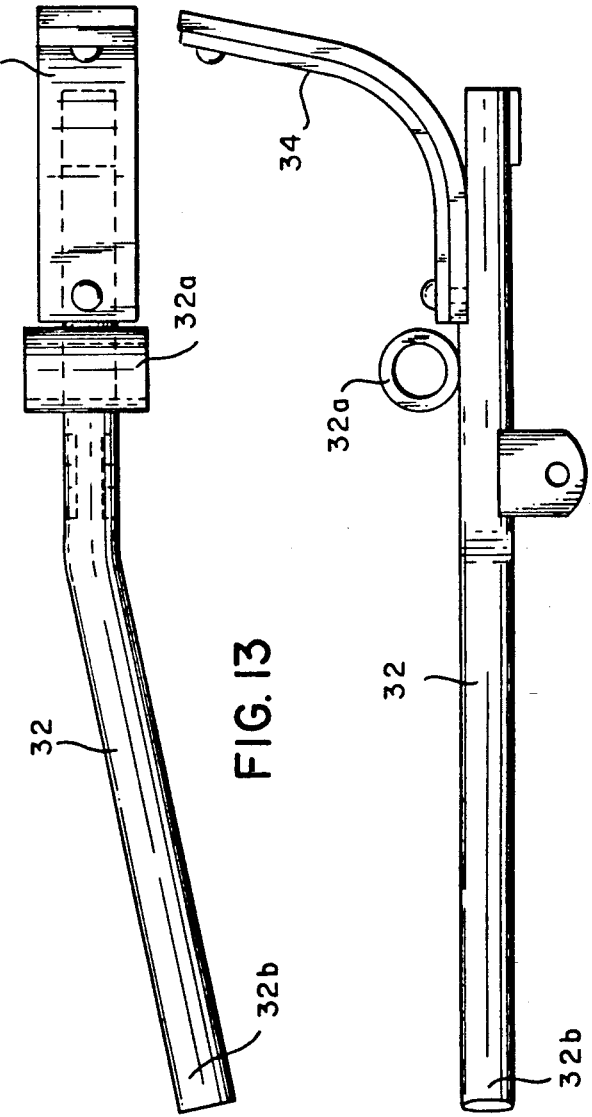
FIG. 12

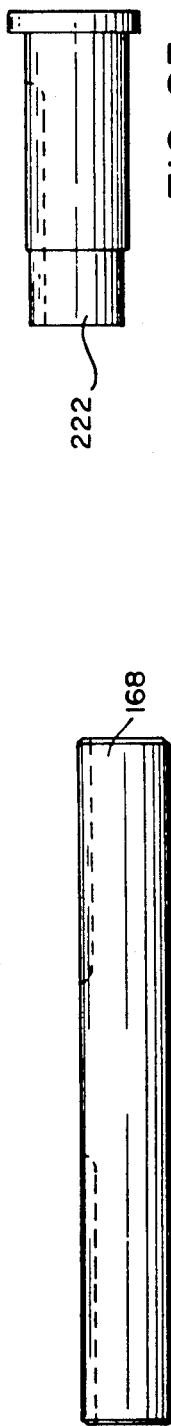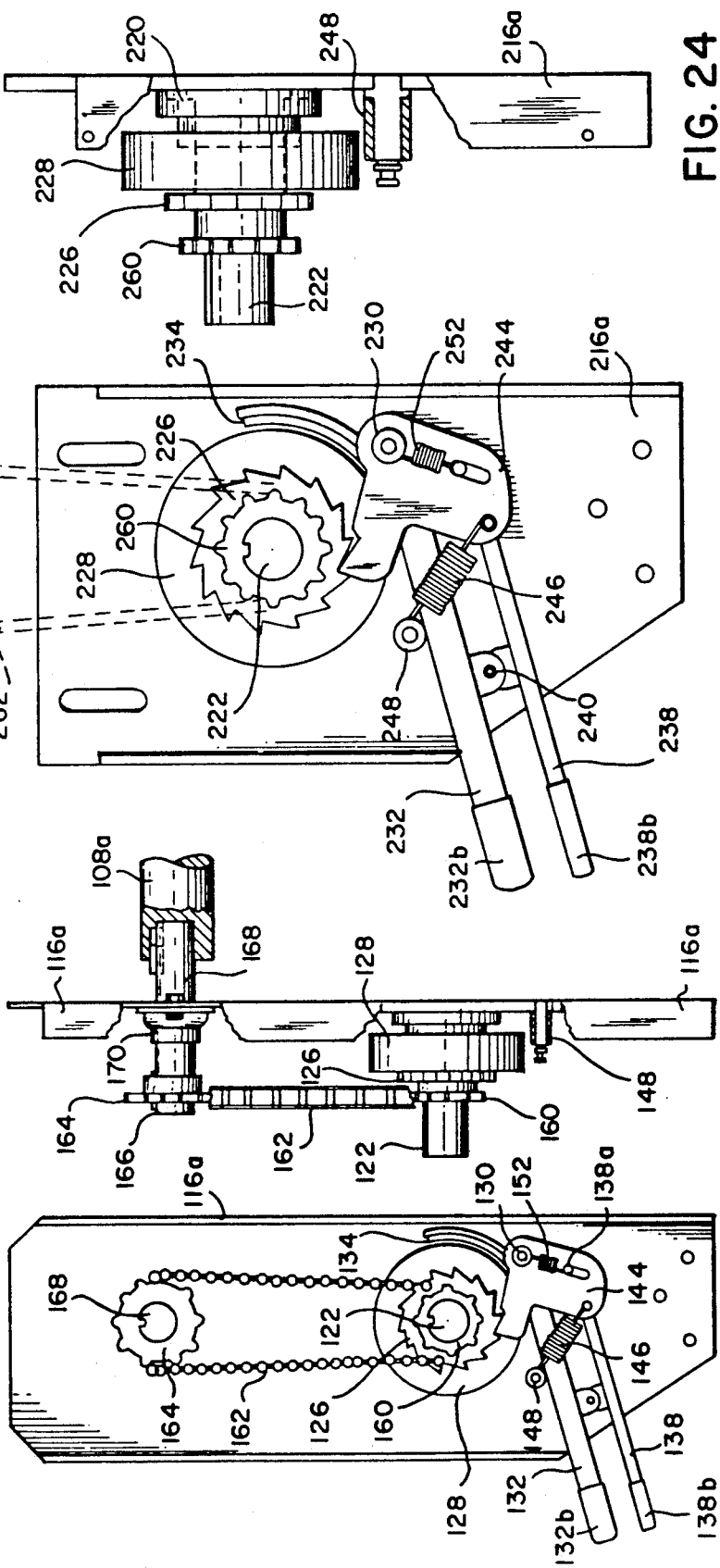

TARP COVER SYSTEM WITH LEVER-OPERATED LOCKING AND BRAKE MEANS

STATEMENT OF THE INVENTION

A tarp cover system for a vehicle having an open-top truck is provided including an improved lever arrangement for initially disengaging a pawl and ratchet locking mechanism to release a rolled-up tarp cover, and for subsequently braking the roll as the tarp cover is automatically unwound by spring biasing means connected with the free end of the cover. The lever arrangement is first squeezed with one hand to release the pawl, and is subsequently pivoted by the same hand to brake in a controlled manner the unrolling of the spring-biased cover.

BRIEF DESCRIPTION OF THE PRIOR ART

In the U.S. Pat. No. 3,549,199, to Sibley, a tarp cover arrangement for trucks is disclosed in which a lever is pivoted in one direction to engage the teeth of a sprocket gear to lock the cover in a rolled up condition, and in the other direction to brake the cover roll as it is unwound by spring means connected with the free end of the cover. This known system has the drawback that use of both hands by the operator are required during the truck uncovering operation, since one hand is used to crank the roll against the force of the return spring biasing means, and another hand is required to pivot the lever in one direction toward the roll locking position in engagement with the sprocket teeth. Similarly, during the unrolling operation, the crank must be held by one hand of the operator while the lever is pivoted in the opposite direction toward the braking position in engagement with the hub portion of the sprocket gear.

The present invention was developed to afford an improved locking and braking arrangement that is operable in a simple efficient manner by the use of only one hand of the operator.

SUMMARY OF THE INVENTION

Accordingly, a primary object of the present invention is to provide an improved tarp cover system including pawl and ratchet locking means for locking a tarp roll in a partially or fully rolled-up condition, in combination with lever means that are initially squeezed by one hand of the operator to release the pawl and ratchet locking means, and are subsequently pivoted by the same hand to brake the unwinding of the cover against the force of spring biasing means connected with the free end of the cover.

According to another object of the invention, the ratchet member of the locking means is mounted on the crank shaft of the operating means, whereby the roll is continuously locked against inadvertent unrolling even when in a partially rolled condition. In one embodiment the crank shaft is directly connected with the tarp cover roll, and in another embodiment, the crank shaft is connected with the tarp cover roll via sprocket gear and chain means, whereby the cover systems of large trucks may be operated by an operator standing at ground level.

A more specific object of the invention is to provide a lever arrangement including a first lever pivotally connected intermediate its ends with a housing adapted for attachment to the vehicle, and a second lever pivotally connected intermediate its ends with the first lever, said second lever being pivoted relative to said first lever by one hand of the operator to release the pawl and ratchet locking means, and said first lever being pivoted relative to the housing by the use of the same hand to apply brake means for controlling the unrolling of the cover by biasing means.

BRIEF DESCRIPTION OF THE DRAWINGS

Other objects and advantages of the invention will become apparent from a study of the following specification when viewed in the light of the accompanying drawings, in which:

FIGS. 1–4 are perspective views illustrating the manner in which a tarp cover is unrolled to cover the open-top body of a truck;

FIG. 5 is a perspective view of the torsion spring biasing means for biasing the cover bail member toward the body-covered position;

FIGS. 6 and 7 are perspective views illustrating the operation of first and second embodiments of the invention, respectively;

FIG. 8 is a front elevational view, with certain parts broken away, of the cover operating apparatus of FIG. 6;

FIG. 9 is a sectional view, with certain parts removed for clarity, taken along line 9—9 of FIG. 8;

FIGS. 10 and 11 are side elevation and top plan views, respectively, of the pawl operating lever of FIG. 8;

FIGS. 12 and 13 are side elevation and top plan views, respectively, of the brake operating lever of FIG. 8;

FIGS. 14 and 15 are front and end elevation views, respectively, of the pawl of FIG. 8;

FIGS. 16 and 17 are elevational views of the crank shaft and pivot post members of FIG. 8;

FIGS. 18 and 19 are longitudinal sectional views of the crank hub and bearing holder members;

FIGS. 20 and 21 are front and side elevation views, respectively, with certain parts broken away, of a second embodiment of the invention;

FIG. 22 is a side elevation of the intermediate cover roll shaft of FIGS. 20 and 21;

FIGS. 23 and 24 are front and side elevational views, respectively, with certain parts broken away, of a third embodiment of the invention; and FIG. 25 is an elevational view of the crank shaft of FIGS. 23 and 24.

DETAILED DESCRIPTION

Referring first more particularly to FIGS. 1–4, the tarp cover system of the present invention is adapted for use with a motor vehicle 2 having an open-topped truck body 4 that is to be covered by a flexible waterproof tarp cover 6. Initially, the tarp cover is rolled to define a tarp roll 8 mounted for rotation adjacent one end of the truck body, the free end of the tarp cover being connected with a U-shaped bail member 10 the leg portions of which are pivotally connected at their extremities intermediate the ends of the truck body 14. Torsion spring means 12 (FIG. 5) bias the bail member rearwardly from the position of FIG. 1 to the closed position of FIG. 4, whereby the tarp cover is unwound from the tarp roll 8 to fully cover the truck body. In order to rotate the tarp roll 8 in the opposite direction and thereby wind the cover member on the roll, manually operable crank means 14 are provided adjacent one end of the tarp roll. As shown in FIG. 6, the crank means 14 may be mounted on the vehicle directly opposite the tarp cover roll, while in the second embodiment illustrated in FIG. 7, which is suitable for use with larger trucks, the crank means 14' is mounted at a lower elevation for operation by an operator standing on the ground, the crank means being connected with the tarp cover roll by sprocket gear and chain means 16, as will be described in greater detail below.

Referring now to FIGS. 8 and 9, the crank operating means 14 includes a housing 16 having a generally U-shaped rigid base portion 16a stamped from sheet metal, such as steel, and a removable cover member 16b that is secured to the base 16a by means of screws or bolts 18.

Rotatably connected with the housing 16 by bearing means 20 (FIG. 9) is a crankshaft 22. At one end, the crankshaft 22 extends through the bottom wall of the housing base portion 16a for direct keyed non-rotatable connection with the tarp cover roll shaft 8a. At its other end, the crankshaft 22 is adapted to be keyed in non-rotatable relation with the crank operating means 24, as shown in FIG. 9. Intermediate its ends, the crankshaft 22 has concentrically mounted thereon a ratchet member 26 and a brake drum 28, which members are non-rotatably connected with the crankshaft either by keying and/or welding.

Pivotally connected intermediate its ends with the housing 16 by means of pivot post 30 (FIGS. 8 and 17) is a first lever arm 32 provided at one end with a curved brake shoe 34 adapted for cooperation with the brake drum 28. The pivot pin 30 extends through a corresponding rigid sleeve 32a that is mounted transversely intermediate the ends of the first lever 32. At its other end, the lever is bent to define a handle portion 32b.

A second lever 38 is provided that is pivotally connected intermediate its ends with the first lever 32 by means of pivot pin 40, as shown in FIG. 8. At one end, the lever 38 is bent to define a laterally extending portion 38a, and at its other end, the second lever 38 is provided with a laterally displaced handle portion 38b that extends adjacent the handle portion 32b of the first lever 32.

Also pivotally mounted on the pivot post 30 is a pawl member 44, having a pawl tooth 44a operable to engage a corresponding one of the ratchet teeth of ratchet 26. A first tension spring 46 connected between the pawl 44 and a stop post 48 on the housing normally biases the pawl in the clockwise direction for engagement with the ratchet 26. The pawl contains a slot 50 that receives the lateral portion 38a at the extremity of the second lever 38. A second spring 52 connected between pivot post 30 and the lateral extremity 38a biases the second lever 38 in the counterclockwise direction about pivot 40 relative to the first lever 32. The configuration of the slot 50 in pawl 44 is such that when the handle portions 32b and 38b of the levers 32 and 38 respectively, are squeezed together, the lateral portion 38a of lever 38 rides downwardly in slot 50 to pivot pawl in the counterclockwise direction, thereby disengaging the pawl tooth 44a from the associated ratchet tooth. Stop post 48 also serves to limit the extent of pivotal movement of lever 32 in the clockwise direction.

As shown in FIGS. 14 and 15, the pawl 44 has a laterally extending tubular neck portion 44a that receives the pivot shaft 30, thereby to space the pawl the appropriate distance from the bottom wall of the housing member 16a for cooperation with the ratchet 26.

Operation

In operation, assume that the apparatus of FIGS. 8 and 9 is connected to the tarp cover roll shaft 8a as shown in FIG. 6. To uncover the vehicle of FIG. 4, the operator turns the crank 24 to rotate crankshaft 22 and tarp cover shaft 8a in the clockwise direction, the pawl 44 riding in ratcheting engagement with the ratchet 26. As the cover is rolled upon a tarp cover shaft 8a, the bail 10 is pivoted forwardly against the restoring force of torsion spring 12, and when the cover has been rolled completely upon the shaft 8a, the truck body 4 is uncovered as shown in FIG. 1. Pawl tooth 44a is now in engagement with a corresponding ratchet tooth to lock crank shaft 22 and cover roll shaft 8a against rotation in the cover-unwinding direction. Lever 24 is then removed from crankshaft 24a.

In order to cover the truck body 4, the operator merely squeezes together the handle portions 32b and 38b of the levers 32 and 38, whereupon lateral extension 38a rides down slot 50 to pivot pawl 44 in the counterclockwise direction against the biasing force of spring 46, whereupon pawl tooth 44a is disengaged from the ratchet 26. Owing to the restoring force of torsion springs 12, the bail member 10 is progressively pivoted rearwardly to displace in the rearward direction the free end of the cover member secured thereto. This unwinding of the cover from the tarp cover roll 8 may be controlled by pivoting lever arm 32 about pivot post 30, thereby to cause brake shoe 34 to engage the periphery of drum 28 and retard the rotation of tarp cover shaft 8a in the unwinding direction. According to an advantage of the invention, as shown in FIG. 6, the operator may pivot lever 32 to effect the desired braking of crankshaft 22 and roll shaft 8a by the same hand that was used to squeeze together the handle portions 32b and 38b to disengage pawl 44 from ratchet 26. The braking of the drum 28 and crankshaft 22 is controlled by pivotal movement of lever 32 in the counterclockwise direction in FIG. 8. The extent of movement of lever 32 in the clockwise direction is limited by stop post 48.

Referring now to FIGS. 20 and 21, the tarp roll shaft 108a is driven from crankshaft 22 by means of sprocket gear 160 secured to crankshaft 122, sprocket chain 162, and sprocket gear 164 that is non-rotatably connected by key 166 with intermediate shaft 168, which shaft is keyed to the tarp cover roll shaft 108a. Intermediate shaft 168 is rotatably journalled in suitable bearing means 170 that is fastened to housing base member 116a.

As in the embodiment of FIGS. 8 and 9, the stop post 148 to which the spring 146 is connected serves as a stop limiting movement of the brake operating lever 32 in the clockwise direction. Thus, in order to release a tarp cover rolled upon tarp roll shaft 108, the crank handle is removed from crankshaft 122, and lever handles 132b and 138b are squeezed together, thereby to disengage pawl 144 from ratchet member 126. Owing to the biasing force of the torsion springs acting on the associated bail member, the bail member is pivoted rearwardly to unwind the tarp cover from 25 the roll formed on shaft 108a. The rotary motion of the tarp cover shaft 108a is transmitted to the crankshaft 122 via sprocket care 164 sprocket chain 162 and sprocket gear 160, whereupon brake lever 132 is pivoted in the counterclockwise direction to cause brake shoe 134 to engage the peripheral surface of brake drum 128, thereby to control the speed of withdrawal of the tarp cover from the roll 108 under the biasing force of the return spring means.

Referring now to the embodiment of FIGS. 23-25, the crankshaft 222 is connected with housing 216a by bearing means 220, the sprocket gear 260 and ratchet 226 and drum 228 being non-rotatably connected with the crankshaft. In this embodiment, the sprocket chain 262 connects a remotely located sprocket (not shown) adjacent a corresponding tarp cover roll. Thus, as distinguished from the embodiment of FIGS. 20 and 21 wherein the intermediate shaft 168 is journalled to the housing 116a, in the embodiment of FIGS. 23-25, the auxiliary sprocket gear is not rotatably connected with the housing 216a, but rather is remotely located in spaced relation thereto.

While in accordance with the provisions of the Patent Statutes the preferred forms and embodiments of the invention illustrated and described, it will be apparent to those skilled in the art that various changes may be made without deviating from the concepts set forth above.

What is claimed is:

1. A tarp cover operating system for use with a vehicle (2) having an open-top truck body (4) including pairs of opposed side and end walls, respectively, a cover roll shaft (8a) rotatably connected with the vehicle above, and extending horizontally transversely across, the truck body adjacent one end wall thereof, a cover (6) connected at one end with the roll shaft, and spring means (12) biasing the other end of the cover toward the other truck body end wall, comprising:

(a) a housing (16) including a crank shaft (22) rotatably connected with said housing for rotation in a first direction to wind the cover on the cover roll shaft;
    (b) crank means including crank shaft (22) rotatably connected with said housing for rotation in a first direction to wind the cover on the cover roll shaft;
    (c) pawl and ratchet means (44,26) connected with said housing for normally preventing rotation of said crank shaft in the opposite direction;
    (d) brake means (34,28) connected with said housing and operable upon disengagement of said pawl and ratchet means for braking said crank shaft during the rotation thereof in said opposite direction; and
    (e) lever means (32,38) connected with said housing for initially disengaging said pawl and ratchet means and for subsequently operating said brake means, thereby to permit controlled covering of the truck body during displacement of the other end of the cover by the spring means toward the other truck body end wall.

2. Apparatus as defined in claim 1, wherein said brake means includes a brake drum (28) connected with said crank shaft, and a brake shoe (34) adapted to engage said brake drum; and further wherein said lever means includes a first lever (32) pivotally connected with said housing, said brake shoe being mounted on said first lever for engagement with said drum when said first lever is manually pivoted in one direction relative to said housing.

3. Apparatus as defined in claim 2, wherein said first lever is pivotally connected intermediate its ends with said housing, said brake shoe being connected with said first lever adjacent one end thereof.

4. Apparatus as defined in claim 3, wherein said lever means includes a second lever (38) pivotally connected with said first lever for unlocking said pawl and ratchet means.

5. Apparatus as defined in claim 4, wherein said pawl and ratchet means includes a pawl (44) pivotally connected with said housing, a ratchet (26) rotatably connected with said housing, said ratchet also being non-rotatably connected with said shaft, and first spring means (46) normally biasing said pawl toward engagement with said ratchet.

6. Apparatus as defined in claim 5, wherein said second lever is pivotally connected intermediate its ends with said first lever, one end of said second lever extending adjacent said pawl, the other ends of said first and second levers defining handle portions (32b, 38b) terminating adjacent each other, and further including means connecting said second lever with said pawl in such a manner that when said handle portions are manually displaced together, said second lever is pivoted in one direction relative to said first lever to disengage said pawl from said ratchet.

7. Apparatus as defined in claim 6, wherein said means connecting said second lever with said pawl includes a lateral portion (38a) on said second lever that extends within a corresponding slot contained in said pawl, the configuration of said slot being such that said pawl is disengaged from said ratchet when the handle ends of said levers are manually displaced together.

8. Apparatus as defined in claim 6, and further including second spring means (52) biasing said second lever in the opposite direction relative to said first lever.

9. Apparatus as defined in claim 5, and further including means defining a stop (48) on said housing for limiting the extent of pivotal movement of said first lever in the opposite direction relative to said housing.

10. Apparatus as defined in claim 9, wherein said first spring means is connected between said stop means and said pawl.

11. Apparatus as defined in claim 8, and further including a pivot shaft (30) connected with said housing and upon which said pawl and said first lever are pivotally mounted, said second spring means being connected between said pivot shaft and said second lever lateral extension.

12. Apparatus as defined in claim 2, wherein said crank means includes a horizontal crank shaft rotatably connected with said housing; and further wherein said pawl and ratchet means includes a ratchet (26), said ratchet and said brake drum being non-rotatably connected with said crank shaft.

13. Apparatus as defined in claim 12, wherein said crank shaft is coaxially arranged relative to the cover roll shaft.

14. Apparatus as defined in claim 12, wherein said crank shaft is parallel with and vertically displaced downwardly relative to the cover roll shaft; and further including sprocket gear and chain means operable to connect said crank shaft with said cover roll shaft.

15. Apparatus as defined in claim 14, wherein said sprocket gear and chain means includes a first sprocket gear (126) coaxially arranged and non-rotatably connected with said crank shaft.

16. Apparatus as defined in claim 15, and further wherein said sprocket gear and chain means includes a second sprocket gear (164) coaxially arranged relative to said cover roll shaft, and means for non-rotatably connecting said second sprocket gear with the cover roll shaft.

17. Apparatus as defined in claim 16, and further including bearing means (170) rotatably connecting said second sprocket gear with said housing.

* * * * *

UNITED STATES PATENT AND TRADEMARK OFFICE
CERTIFICATE OF CORRECTION

PATENT NO. : 5,129,698

DATED : July 14, 1992

INVENTOR(S) : Richard B. Cohrs et al

It is certified that error appears in the above-identified patent and that said Letters Patent is hereby corrected as shown below:

Column 5, lines 10-13, delete "including a crank shaft (22) rotatably connected with said housing for rotation in a first direction to wind the cover on the cover roll shaft"

Signed and Sealed this

Twelfth Day of April, 1994

*Attest:*

BRUCE LEHMAN

*Attesting Officer*  Commissioner of Patents and Trademarks